United States Patent [19]

Nagase et al.

[11] Patent Number: 4,912,374
[45] Date of Patent: Mar. 27, 1990

[54] DISCHARGE LAMP DRIVING CIRCUIT

[75] Inventors: Haruo Nagase, Nara; Akira Satomi, Shijounawate, both of Japan

[73] Assignee: Matsushita Electric Works, Ltd., Kadoma, Japan

[21] Appl. No.: 262,646

[22] Filed: Oct. 26, 1988

[30] Foreign Application Priority Data

Oct. 27, 1987 [JP] Japan .................... 62-271237
Dec. 23, 1987 [JP] Japan .................... 62-326201

[51] Int. Cl.$^4$ ............................................. H05B 37/00
[52] U.S. Cl. .................................... 315/244; 315/226; 315/DIG. 7
[58] Field of Search .............. 315/209 R, 205, 225, 315/226, 243, 244, DIG. 5, DIG. 7

[56] References Cited

U.S. PATENT DOCUMENTS

| | | | |
|---|---|---|---|
| 3,789,266 | 1/1974 | Polman et al. | 315/194 |
| 4,170,747 | 10/1979 | Holmes | 315/307 |
| 4,213,103 | 7/1980 | Birt | 332/9 T |
| 4,291,254 | 9/1981 | Arlt et al. | 315/240 |
| 4,346,332 | 8/1982 | Walden | 315/307 |
| 4,388,563 | 6/1983 | Hyltin | 315/205 |
| 4,547,706 | 10/1985 | Krummel | 315/226 |
| 4,595,863 | 6/1986 | Henning | 315/208 |
| 4,603,378 | 7/1986 | Virta | 363/56 |
| 4,734,624 | 3/1988 | Nagase et al. | 315/243 |

FOREIGN PATENT DOCUMENTS 60-262392 12/1985 Japan .

Primary Examiner—Eugene R. LaRoche
Assistant Examiner—Robert J. Pascal
Attorney, Agent, or Firm—Armstrong, Nikaido, Marmelstein, Kubovcik & Murray

[57] ABSTRACT

A discharge lamp driving circuit includes a chopper with a first switching circuit and an inverter with a second switching circuit. The chopper and inverter are connected to a dc voltage source and controlled to produce a composite lamp driving current composed of a high frequency alternating current interrupted by a dc current in order to keep the discharge lamp free from an acoustic resonance. The chopper and the inverter are arranged to have at least one common switching element in their first and second switching circuits.

9 Claims, 9 Drawing Sheets

DISCHARGE LAMP DRIVING CIRCUIT

BACKGROUND OF THE INVENTION

1. Field of the Invention

The present invention is directed to a discharge lamp driving circuit, and more particularly to a circuit for operating a high-pressure gaseous discharge lamp without causing a harmful acoustic resonance.

2. Description of the Prior Art

There has been a growing demand for a discharge lamp operating circuit which is operated at a higher frequency in order to reduce the weight and bulk of the ballasting inductor On the other hand, it is also known that discharge lamps, particularly high-pressure discharge lamps Such is mercury high pressure lamps and sodium vapor lamps suffer from unstable discharge arcs due to "acoustic resonance" when operated at certain high frequencies. U.S. Pat. No. 4,291,254 proposed to select a stable frequency for avoiding such "acoustic resonance". However, such stable frequency is seen only in a limited range and differs from different kinds of lamps, thus reducing the flexibility of circuit design. Further, it is known that an extreme high frequency drive, for example, over 100 KHz may be effective for elimination of the "acoustic resonance", but this eventually results in considerable switching losses and noises which are not acceptable for the lamp operation. To this end, there has been proposed in Japanese Patent Publication (KOKAI) No. 60-262392 to drive the lamp by a composite lamp driving Current having a repeating cycle of an alternating current interrupted by a dc current. This patent is based upon the finding that the repetitive interruption of the alternating current by the dc current can restrain the occurrence of the "acoustic resonance", even the alternating current is in a frequency range which would otherwise cause the "acoustic resonance". In this sense, this patent is advantageous in selecting a lamp drive frequency without having to consider the "acoustic resonance". Notwithstandinq this advantage, the patent has a certain drawback in that two independent switching circuits, i.e., chopper and inverter circuits, are required for providing the dc current and the alternating current, respectively. This requires duplication of switching elements with consequent complexity in incorporating the respective drivers in circuits for the duplicated switching elements, thus eventually resulting in increased cost and bulk of the physical circuit assembly.

SUMMARY OF THE INVENTION

The present invention eliminates the above problem by commonly utilizing at least one switching element for chopper and inverter switching circuits and provides an improved discharge lamp driving circuit with simplified circuit arrangement.

It is therefore a primary object of the present invention to provide an improved discharge lamp driving circuit which is simple in configuration, yet preventing the acoustic resonance as well as assurinq to make compact the physical arrangement of the circuit.

An improved discharge lamp driving circuit in accordance with the present invention comprises a dc (direct current) voltage source, chopper means, and inverter means. The chopper means comprises a first switching circuit which is coupled to the dc voltage source to provide therefrom a periodically interrupted current and smooth the same for producing a smoothed dc current. The inverter means comprises a second switching circuit which is also coupled to the dc voltage source for producing therefrom a high frequency alternating current. Included in the circuit is control means which is connected to the chopper means and the inverter means in order to apply to the discharge lamp a repeating cycle of a composite lamp driving current composed of the high frequency alternating current supplied from the inverter means and is interrupted by the smoothed dc current supplied from the chopper means.

A characterizing feature of the present invention resides in that the first and second switching circuits of the chopper and inverter means are arranged to have at least one common switching element which operates both in producing the dc current and the high frequency alternating current. With this result, the circuit Configuration can be considerably simplified with consequent reduction in cost and bulk of the device.

In a preferred embodiment, the chopper means is configured in a bridge arrangement to apply to the discharge lamp the smoothed dc current which is reversed in polarity from one cycle to the subsequent cycle of the composite lamp driving current. Thus, the deterioration of lamp electrodes can be reduced to a minimum, thereby giving rise to an enhanced life time of the discharge lamp.

The lamp driving circuit of the present invention can be broadly classified into two types with and without a transformer which operates to apply the high frequency alternating current to the discharge lamp. In the former type, the first switching circuit of the chopper means comprises at least one switching element common to the second switching circuit of the inverter means. The common switching element is coupled in series circuit with an inductor and a parallel combination of the discharge lamp and a bypass capacitor of which series circuit is connected across the dc voltage source. During a first period of time, the common switching element is controlled to turn on and off at a first high frequency to produce the interrupted current which is smoothed by the first inductor and of which high frequency component is bypassed through the bypass capacitor for giving the smoothed dc current to the discharge lamp within each cycle of the composite lamp driving current. The second switching circuit of the inverter means comprises a pair of first and second switching elements at least one of which is common to the first switching circuit of the chopper means. The first and second switching elements are connected in series across the dc voltage and is connected in circuit with a dc blocking capacitor and the transformer with a primary winding and a secondary winding which is inserted in series relation with the discharge lamp and in parallel relation with the bypass capacitor. The blocking capacitor is connected in series with the primary winding of the transformer and in parallel with one of the first and second switching elements to form therewith a series oscillating circuit. During a second period of time alternating with the above first period of time, the first and second switching elements are controlled to alternately turn on and off at a second frequency to provide a high frequency alternating current in the series oscillating circuit as repeating to charge and discharge the dc blocking capacitor, whereby inducing the corresponding high frequency alternating current in the circuit of the secondary winding and the discharge lamp to drive the discharge lamp by such high frequency alternating current within each cycle of the composite lamp driving current.

In the other type of the circuit without the transformer, the first and second switching circuits of the chopper and inverter means commonly includes a pair of first and second switching elements arranged in a half- or full-bridge configuration with a pair of capacitors or with a pair of like switching elements. The bridge has its input ends connected across the dc voltage source and has its output ends connected across a series circuit composed of an inductor and a parallel combination of the discharge lamp and a bypass capacitor. During a first period of time, one of the first and second switching elements is controlled to turn on and off at a first frequency with the other switching element being kept turned off to provide a dc current which is smoothed by the inductor and is removed of its high frequency component by the bypass capacitor for feeding the smoothed dc current to the discharge lamp within each cycle of the composite lamp driving current. During a second period of time alternating with the first period of time, the first and second switching elements are controlled to alternately turned on and off at a second high frequency in such a manner as to provide to the discharge lamp said high frequency alternating current within each cycle of said composite lamp driving current. The second high frequency is determined to be lower than the first high frequency to such an extent that the second high frequency alternating current is supplied to the discharge lamp within each cycle of the composite lamp driving current while allowing the second high frequency component to be substantially fed to the discharge lamp without being bypassed through the bypass capacitor.

DETAILED DESCRIPTION OF THE PREFERRED EMBODIMENTS

Figure 1:
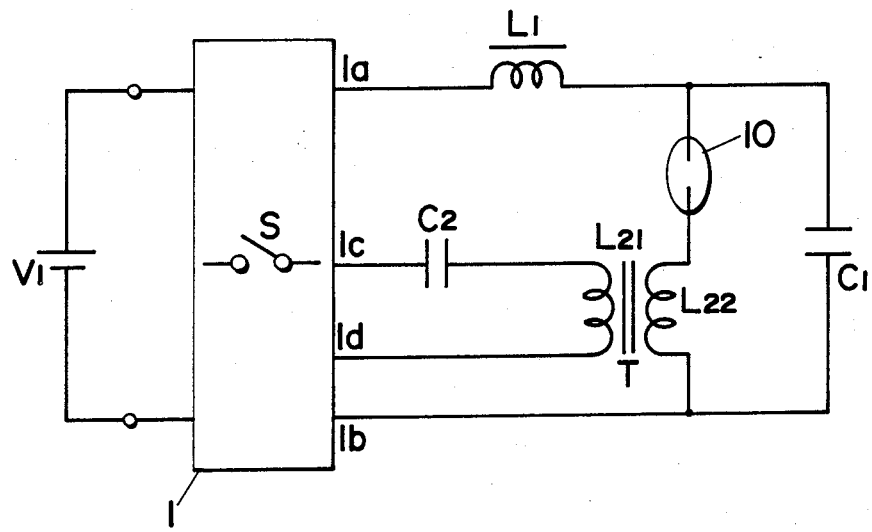
FIG. 1 is a schematic diagram of a discharge lamp driving circuit illustrating one basic version in accordance with the principle of the present invention.
Figure 2:
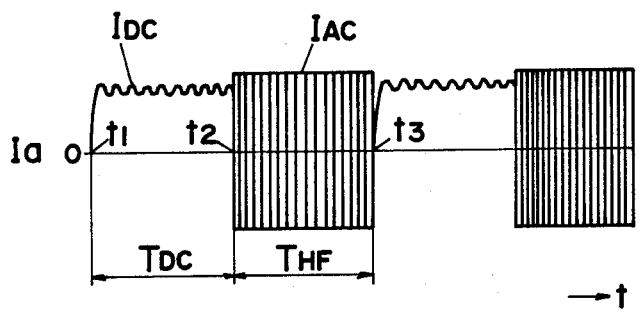
FIG. 2 is a waveform chart illustrating a composite lamp driving current in a conceptual form obtained in the present invention.

Referring now to FIG. 1, one version of a discharge lamp driving circuit in accordance with the present invention is shown in a general form for easy understanding of the principle of the present invention. The circuit comprises a switching section 1 which is connected across a dc voltage source $V_1$ and includes at least two switching elements or transistors collectively indicated in FIG. 1 as S. The switching section 1 has a first pair of output ends 1a and 1b between which is connected a series circuit of an inductor $L_1$ and a parallel combination of a discharge lamp 10 and a bypass capacitor $C_1$. Also provided at the switching section 1 is a second pair of output ends 1c and 1d between which is connected a circuit of a dc blocking capacitor $C_2$ and a transformer T with a primary winding $L_{21}$, and a secondary winding $L_{22}$. The secondary winding $L_{22}$ is coupled in series with the discharge lamp 10 in parallel relation with the bypass capacitor $C_1$. The switching section 1 is controlled, during a first period of time $T_{DC}$ ($t_1 - t_2$), to repetitively interrupt the dc voltage at a first high frequency for providing a chopped voltage between the first pair of output ends 1a and 1b. The chopped voltage is then smoothed by the inductor $L_1$ and has its high frequency component bypassed through the bypass capacitor $C_1$ to thereby feed a smoothed dc current $I_{DC}$ to the discharge lamp 10 during the first period $T_{DC}$, as shown in FIG. 2 which shows a composite lamp driving current Ia in a conceptual waveform. During a second period of time $T_{HF}$ ($t_2-T_3$) alternating with the first period of time $T_{HF}$, the switching section 1 is controlled to repetitively interrupt the dc voltage at a second high frequency in order to repeat producing a voltage between output ends 1c and 1d and shorting the same. While the positive voltage is developed across the output ends 1c and 1d, the voltage is applied through the dc blocking capacitor $C_2$ to the primary winding $L_{21}$ of the transformer T so as to flow a current in one direction in the primary winding $L_{21}$ as charging the blocking capacitor $C_2$. Upon subsequent shorting between the output ends 1c and 1d, the blocking capacitor $C_2$ discharges to feed an opposite current through the primary winding $L_{21}$. consequently, the above repetition of developing the voltage and shorting between the output ends 1c and 1d will induce an alternating current with the second high frequency at the secondary winding $L_{22}$ of the transformer T such that the resulting high frequency alternating current is caused to circulate through the closed loop of the lamp 10 and the bypass capacitor $C_1$ as it is blocked by the inductor $L_1$, whereby providing to the lamp the high frequency alternaing current $I_{AC}$ during the second period of time $T_{HF}$, as shown in FIG. 2. In this manner, the switching section 1 provides a repeated cycle of a composite lamp driving current composed of the high frequency alternating current $I_{AC}$ interrupted by the dc current $I_{DC}$. With this result, the lamp 10 can be kept free from causing an acoustic resonance or instable lamp operation even if the alternating current has a high frequency which might cause such acoustic resonance when utilized alone. The second frequency of the alternating lamp current may be suitably selected to be equal to or different from the first frequency a which the switching section 1 is operated to chop the dc voltage. With the circuit arrangement of FIG. 1, it is possible to share at least one switching element in the switching section 1 which operates both in a chopper mode for providing the dc current $I_{DC}$ and in an inverter mode of providing the high frequency alternating current $I_{AC}$. It is also noted in this connection that other components can be commonly and effectively utilized in the above two different operation modes. For example, the bypass capacitor $C_1$, which acts to bypass the high frequency component of the dc current in the chopper mode, serves to complete the closed loop with the secondary winding $L_{22}$ and the discharge lamp 10 to effectively apply to the discharge lamp 10 the alternating voltage developed at the secondary winding $L_{22}$ in the inverter mode. Also the inductor $L_1$, which smooths the chopped voltage in the chopper mode, serves to block the high frequency voltage and prevent it from being applying to the circuit other than the closed loop, thereby applying the high frequency voltage effectively to the discharge lamp 10 in the inverter mode. Further, the secondary windinq $L_{22}$ of the transformer T, which develops the high frequency voltage as a power source in the inverter mode, can serve to block the high frequency component of the chopped voltage in the chopper mode, assisting to bypass the high frequency component through the bypass capacitor $C_1$. The discharge lamp 10 may be a high pressure gaseous discharge lamp such as mercury high pressure discharge lamp with metal halogen additives, sodium vapor lamp, and the like, or may be a low pressure lamp. The present invention is now discussed in more detail with reference to preferred embodiments. Like numerals designate like parts throughout the following embodiments for easy reference.

Figure 3:
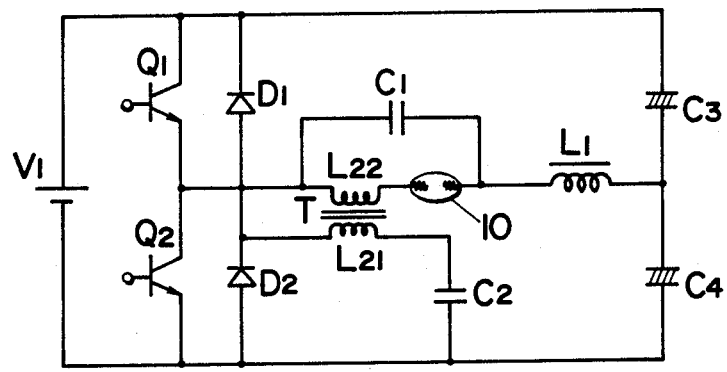
FIG. 3 is a circuit diagram of a discharge lamp driving circuit in accordance with a first embodiment of the present invention.
Figure 4:
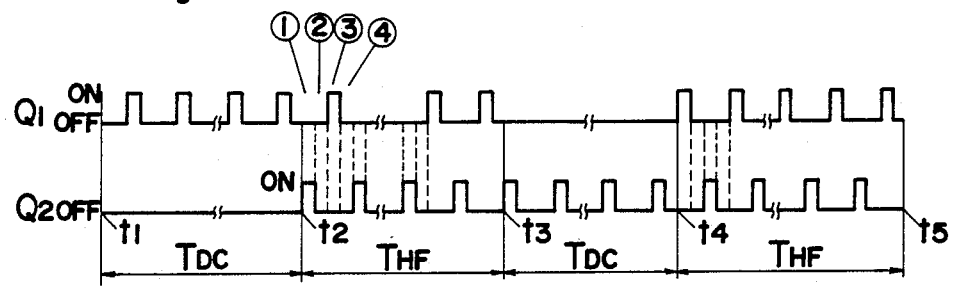
FIG. 4 is a timing diagram of waveforms illustrating the operation of the two switching transistors shown in FIG. 3.
Figure 5:
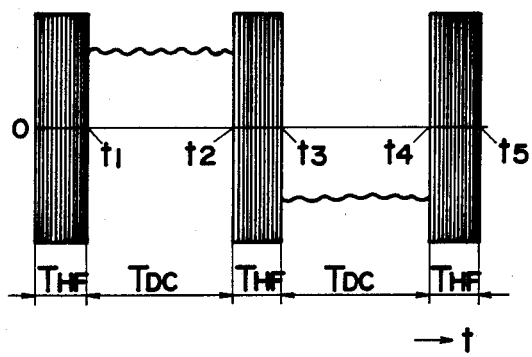
FIG. 5 is a waveform chart illustrating a composite lamp driving current in a conceptual form obtained in the circuit of FIG. 3.

FIRST EMBODIMENT <FIGS. 3 to 5>

In this embodiment, the circuit comprises a pair of first and second switching transistors $Q_1$ and $Q_2$ which are cooperative with a pair of capacitors $C_3$ and $C_4$ to form a half-bridge having its input ends connected across a dc voltage source $V_1$. Connected across the output ends of the of half-bridge is a series circuit composed of an inductor $L_1$ and the parallel combination of a discharge lamp 10 and a bypass capacitor $C_1$. The first and second switching transistors $Q_1$ and $Q_2$ are cooperative with the series circuit to form a chopper which provides a dc current to the discharge lamp 10. A transformer T is incorporated in the circuit with its primary winding $L_{21}$ connected in series with a dc blocking capacitor $C_2$ across the second switching transistor $Q_2$ and with its secondary winding $L_{22}$ inserted in series with discharge lamp 10 and in parallel with the bypass capacitor $C_1$. The series connection of the primary winding $L_{21}$ and the blocking capacitor $C_2$ is cooperative with the first and second switching transistors $Q_1$ and $Q_2$ to form an inverter or series oscillating circuit which provides a high frequency alternating current to the discharge lamp 10. As discussed in the below, the first and second switching transistors $Q_1$ and $Q_2$ are controlled to provide repeating cycles of a composite lamp driving current composed of the dc current fed from the chopper and the high frequency alternating current from the inverter, as shown in FIG. 5. Typical values for the above circuit are as follows. The voltage of the dc voltage source $V_1$ is 280 V, the bypass capacitor $C_1$ has a capacitance of 0.22 $\mu$F, the inductor $L_1$ has an inductance of 0.2 mH, the primary winding $L_{21}$ has an inductance of 0.5 mH, and the blocking capacitor $C_2$ has a capacitance of 0.1 pF. The first and second switching transistors $Q_1$ and $Q_2$ are operated at 40 KHz both in the chopper and the inverter mode. The operation of the chopper is now explained with reference to FIG. 4. During each first period of time $T_{DC}$ alternating with a second period of time $T_{HF}$, one of the first and second switching transistors $Q_1$ and $Q_2$ is controlled to turn on and off at a first high frequency while the other switching transistor is kept turned off. For example, during the first period of time $T_{DC}$ ($t_1-t_2$) of FIGS. 4 and 5, the first switching transistor $Q_1$ repeats turning on and off at a frequency of 40 KHz while the second transistor $Q_2$ is kept turned off. When the first transistor $Q_1$ is on, the capacitor $C_3$ will discharge a current through a route of the first switching transistor $Q_1$, secondary winding $L_{22}$, discharge lamp 10, and inductor $L_1$. When the first transistor $Q_1$ is turned off, the inductor $L_1$ acts to continuously flow the current in the same direction. Thus, the dc current from the capacitor $C_3$ is smoothed by the inductor $L_1$ and has its high frequency component bypassed through the bypass capacitor $C_1$ so as to feed the smoothed dc current to the discharge lamp 10. During the first period of time $T_{DC}$ ($t_3-t_4$), the second switching transistor $Q_2$ turns on and off at the same frequency While the first switching transistor $Q_1$ is kept turned off, thereby producing the like dc current but in opposite polarity, as shown in FIG. 5. With this provision of reversing the polarity of the dc current from one cycle to the subsequent cycle of the composite lamp driving current, the discharge lamp 10 can have an elongated operation life. The second period of time $T_{HF}$ in which the inverter is active to provide the high frequency alternating current is initiated by driving to turn on and off the one of the switching transistor which is kept turned off in the previous first time of period while keeping the other switching transistor turning on and off. For example, in the second period of time $T_{HF}(t_2-t_3)$, the second switching transistor $Q_2$, which has been off in the previous first time of period $T_{DC}$, begins to turn on and off while the first switching transistor $Q_1$ continues to turn on and off. During this period, the first and second switching transistors $Q_1$ and $Q_2$ are alternately turned on and off with a dead-time therebetween, in which both of the switching transistors are simultaneously off, in order to provide the high frequency alternating current. The inverter operation in this period is explained in terms of the repeating sequence of the following four consecutive occurrences (1) to as indicated in FIG. 4.

At the first occurrence (1), the second switching transistor $Q_2$ is turned on while the first switching transistor $Q_1$ is off such that the blocking capacitor $C_2$ which has been charged due to the previous turning on of first switching transistor $Q_1$ will begin discharging to cause a current to flow through the primary winding $L_{21}$, second switching transistor $Q_2$, and back to the blocking capacitor $C_2$. At the second occurrence (2) in which both of the first and second switching transistors $Q_1$ and $Q_2$ are off, the primary winding $L_{21}$ in turn causes the current to continuously flow through a first diode $D_1$, dc voltage source $V_1$, blocking capacitor $C_2$ and back to the primary winding $L_{21}$. At the third occurrence (3), the first switching transistor $Q_1$ is on while the second switching transistor $Q_2$ is off so that the capacitor $C_3$ discharges its energy, causing a current to flow in the opposite direction through the first switching transistor $Q_1$, primary winding $L_{21}$, blocking capacitor $C_2$, capacitor $C_4$, and back to the capacitor $C_3$. At the fourth occurrence 4) where both of the first and second switching transistors $Q_1$ and $Q_2$ are off, the primary winding $L_{21}$ acts to continuously flow the current through a second diode D*, blocking capacitor $C_2$, and back to the primary windinq $L_{21}$ in this sense, the first and second diodes $D_1$ and $D_2$, which are connected in antiparallel relation respectively to the first and second switching transistors $Q_1$ and $Q_2$, provide first and second bypass routes for continuously flowing the instantaneous currents discharged from the primary windinq $L_{21}$ at the second and fourth occurrences in which both of the switching transistors $Q_1$ and $Q_2$ are off. Likewise, in the next second period of time $T_{HF}(t_4-t_5)$ which is initiated by turning on and off the first switching transistor $Q_1$ which has been on in the previous first time of period $T_{DC}$, the first and second switching transistors $Q_1$ and $Q_2$ are controlled to alternately turn on and off to produce the high alternating current through the primary winding $L_{21}$.

In this manner, during each second period of time $T_{HF}$, the high frequency alternating current continues to flow through the primary winding $L_{21}$ to thereby induce at the secondary winding $L_{22}$ the corresponding high frequency alternating current which circulates through the closed loop of the secondary winding $L_{22}$, discharge lamp 10, and the bypass capacitor $C_1$ as the inductor $L_1$ acts to block such high frequency alternating current, whereby driving the discharge lamp 10 by thus obtained high frequency alternating current, as shown in FIG. 5.

It is noted at this connection that the second frequency is determined so that the inductor $L_1$ blocks such high frequency for circulating the high frequency alternating current through the closed loop of the secondary winding $L_{22}$, discharge lamp 10, and bypass capacitor $C_1$. Due to the above the circuit arrangement, the first and second switching transistors are commonly utilized both in the chopper mode of providing the dc current and in the inverter mode of providing the high frequency alternating current to the discharge lamp. In brief, the inverter mode of providing the high frequency alternating current is terminated by deactivating one of the switching transistors, which in turn immediately initiates the chopper mode of providing the dc current to the discharge lamp. Thus, by repeating the above operations, the high frequency alternating current can be repetitively interrupted by the dc current, as shown in FIG. 5, to thereby inhibit the occurrence of the acoustic resonance which would be otherwise develop due to the high frequency lamp driving.

The ratio of the period $I_{DC}$ to the period of one complete cycle ($T_{DC}+T_{HF}$) of the composite lamp driving current may be Suitably selected depending upon the kind of discharge lamp utilized for prevention of the acoustic resonance, as the suitable ratio will vary with different kinds of lamps.

Figure 6:
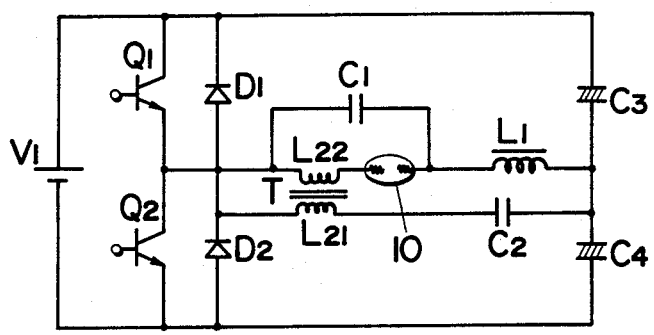
FIG. 6 is a circuit diagram of a modification of FIG. 3.

Modification of the first embodiment <FIG. 6>

This modification shows a circuit arrangement which is identical to that of FIG. 3 except that the dc blocking capacitor $C_2$ is inserted between the primary winding $L_{21}$ and the connection of the capacitors $C_3$ and $C_4$. The circuit provides the like composite lamp driving current of FIG. 5 by the like switching operations of FIG. 4, but in which each of the capacitors $Q_3$ and $Q_4$ is additive to the blocking capacitor $C_2$ to act as a voltage source to provide the high frequency alternating current during the second period of Lime $T_{HF}$. The other functions are identical to those of the first embodiment. In other words, during the second period of time for providing the high alternating current, the capacitors $Q_3$ and $Q_4$ can be made mainly responsible for producing the high frequency alternating current, while the blocking capacitor $C_2$ is responsible for blocking the dc current. Accordingly, the constant of the blocking capacitor $C_2$ can be determined relatively freely without taking into account for utilizing it as the voltage source for the alternating current, thus giving rise to an improved design flexibility of the circuit. Typical values for this circuit when operated on the dc voltage $V_1$ of 280 V are as follows. $C_1=0.22$ $\mu$F, $L_1=0.22$ mH, $L_{21}=0.9$ mH, and $C_2=0.01$ pF. The first and second switching transistors $Q_1$ and $Q_2$ are operated at 40 KHz and 60 KHz, respectively in the chopper mode and the inverter mode.

Figure 7:
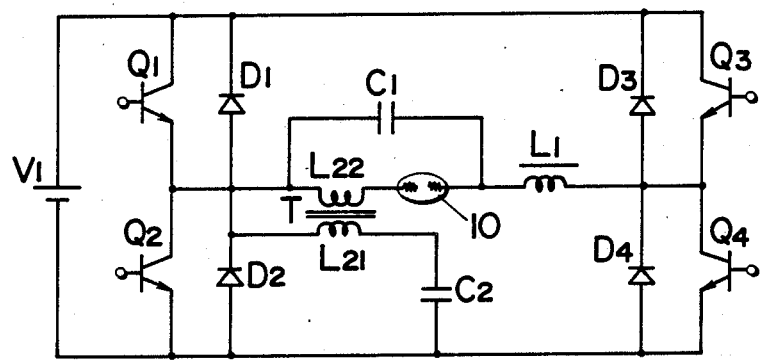
FIG. 7 is a circuit diagram of a second embodiment of the present invention.
Figure 8:
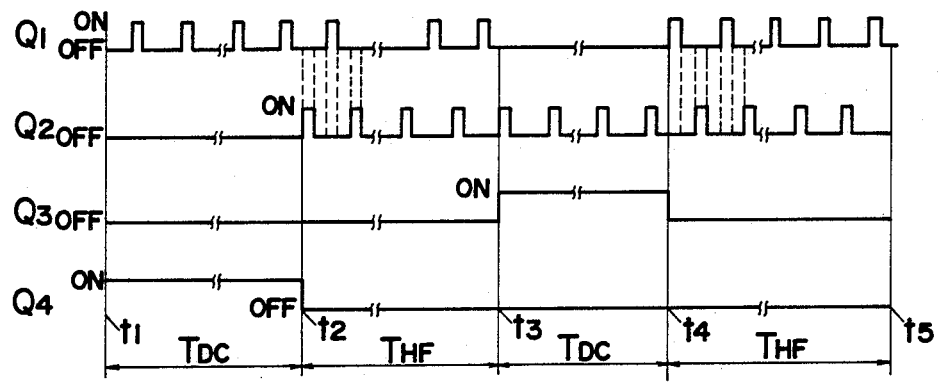
FIG. 8 is a timing diagram of waveforms illustrating the operation of the four switching transistors shown in FIG. 7.

SECOND EMBODIMENT <FIGS. 7 and 8>

Referring to FIG. 7, a second embodiment of the present invention is shown to be identical to the first embodiment of FIG. 3 except for utilizing additional third and fourth switching transistors $Q_3$ and $Q_4$ which are coupled with the first and second switching transistors $Q_1$ and $Q_2$ to form a chopper circuit of full-bridge configuration with third and fourth diodes $D_1$ and $D_4$ connected in antiparallel relation to the third and fourth switching transistors $Q_3$ and $Q_4$ respectively. Thus, as shown in FIG. 8, the one of the two diagonally disposed pairs of switching transistors $Q_1$, $Q_4$, and $Q_2$, $Q_3$ is rendered to be active while the other pair is inactive during the first period of time $T_{DC}$ providing the dc current to the discharge lamp 10. For example, during the first period of time $T_{DC}(t_1-t_2)$, the first switching transistor $Q_1$ is controlled to turn on and off at a first high frequency with the fourth switching transistor $Q_4$ being kept turned on, while the second and third switching transistors $Q_2$ and $Q_4$ are kept turned off. In this manner the switching transistors are controlled to provide the dc lamp current which is opposite in polarity from the period $t_1-t_2$ to the period $t_3-t_4$. In the inverter mode of providing the high frequency alternating current, or in the second period of time $T_{HF}(t_2-t_3, t_4-t_5)$, the first and second switching transistors $Q_1$ and $Q_2$ are controlled in the same manner as in the first embodiment while the third and fourth switching transistors $Q_3$ and $Q_4$ are kept turned off, during which the first and second switching transistors $Q_1$ and $Q_2$ are cooperative with the primary winding $L_{21}$ and the blocking capacitor $C_2$ to oscillate an alternating current through the primary winding $L_{21}$ and the blocking capacitor $C_2$, as repeating the four occurrences which are similar to those discussed with reference to the first embodiment but differ in that the dc voltage $V_1$ will supply an energy to the series oscillating circuit of the primary winding $L_{21}$ and the blocking capacitor $C_2$ when the first switching transistor $Q_1$ is on and the second switching transistor $Q_2$ is off.

Figure 9:
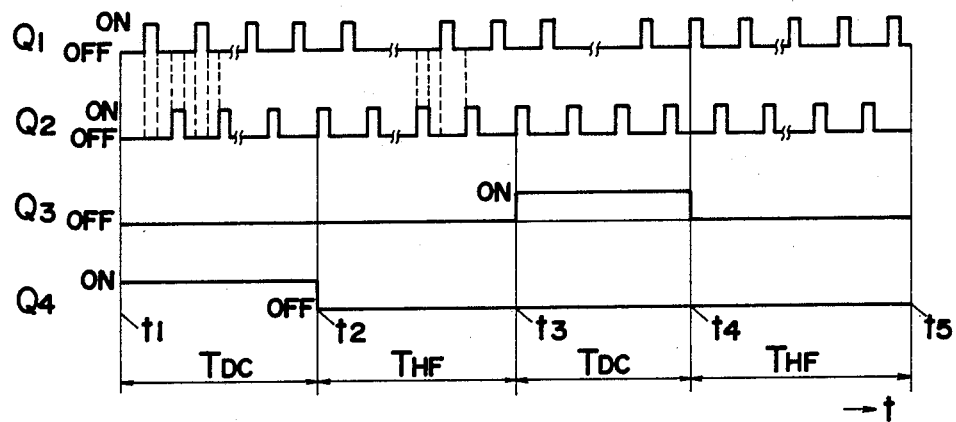
FIG. 9 is a timing diagram of waveforms illustrating another operation of the four switching transistors shown in FIG. 7 in accordance with a modification of the second embodiment.
Figure 10:
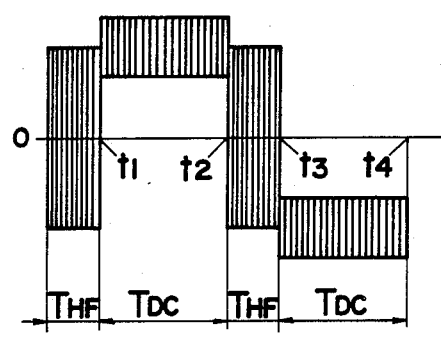
FIG. 10 is a waveform chart illustrating a lamp driving current in a conceptual form obtained by the switching operation of FIG. 9.

MODIFICATION OF THE SECOND EMBODIMENT <FIGS. 9 and 10>

The modification of the second embodiment utilizes the same circuit arrangement f FIG. 7, but operates the first and second switching transistors $Q_1$ and $Q_2$ as shown by the timing diagram of FIG. 9. As seen from FIG. 9, in the chopper mode of providing the dc current during the first period of time $I_{DC}(t_1-t_2, t_3-t_4)$, both of the first and second switching transistors $Q_1$ and $Q_2$ are operative to alternately turn on and off such that during this period $T_{DC}$ the discharge lamp 10 receives, in addition to the smoothed dc voltage from the dc voltage source $V_1$, the induced voltage developed at the transformer T due to the oscillation in the circuit of the primary winding $L_{21}$ and the blocking capacitor $C_2$. Thus, the resulting dc lamp current may take the form of FIG. 10 in which the high frequency component is superimposed on the smoothed dc current $(t_1-t_2, t_3, -t_4)$.

Figure 11:
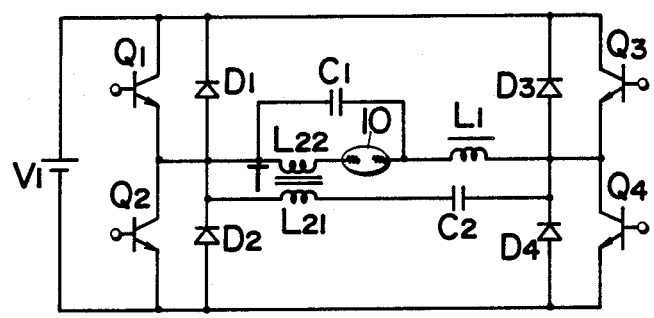
FIG. 11 is a circuit diagram of a third embodiment of the present invention.
Figure 12:
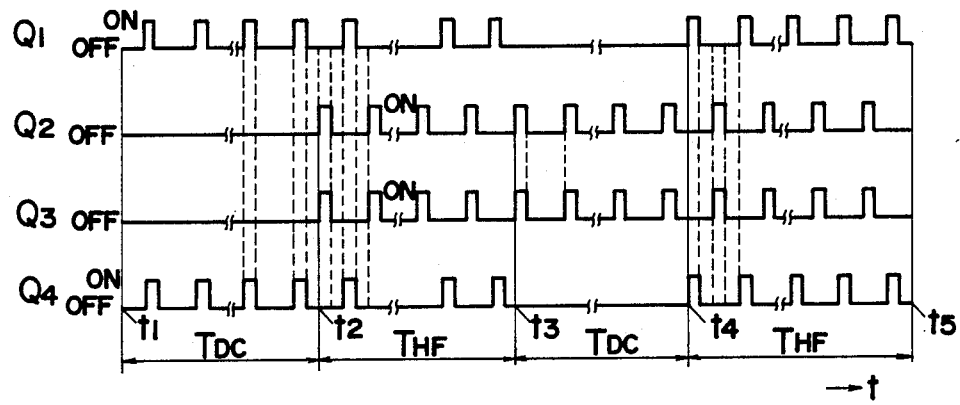
FIG. 12 is a timing diagram of waveforms illustrating the operation of the four switching transistors shown in FIG. 11.

THIRD EMBODIMENT <FIG. 11 and 12>

Referring to FIGS. 11 and 12, a third embodiment of the present invention is shown to comprise the same like circuit as in the second embodiment except that the blocking capacitor $C_2$ has its one end connected to the connection between the third and fourth switching transistors $Q_3$ and $Q_4$. The switching transistors $Q_1$ to $Q_4$ are controlled to turned on and off in accordance with a timing diagram of FIG. 12 to provide the like composite lamp driving current as shown in FIG. 5 for the first embodiment. In the chopper mode, the two diagonally disposed switching transistors, for example, $Q_1$ and $Q_4$, are controlled to turn on and off in a synchronized manner while the other two switching lransistors, for example, $Q_2$ and $Q_3$ are kept turned off during each first period of time $T_{DC}$ in order to provide the dc current to the discharge lamp 10. Due to the synchronous operation of the diagonally disposed switching transistors $Q_1$, $Q_4$ and $Q_3$, $Q_4$ in the chopper mode, the inductor $L_1$ acts upon the subsequent turning off of the all switching transistors to cause the instantaneous dc current to continuously flow through a closed loop to the dc voltage supply $V_1$, thus feeding back the energy thereto. For example, when all of the switching transistors are turned off immediately after the first and fourth switching transistors $Q_1$ and $Q_4$ being turned on, the inductor $L_1$ cause the current to flow through the diode $D_3$, dc voltage source $V_1$, diode $D_2$, secondary winding $L_{22}$, discharge lamp 10 and back to the inductor $L_{21}$. On the other hand when all the switching transistors are turned off after the second and third switching transistors $Q_2$ and $Q_3$ being simultaneously turned on, the instantaneous current from the inductor $L_{21}$ flows through the discharge lamp 10, the secondary winding $L_{22}$, diode $D_1$, dc voltage source, diode $D_4$, and back to the inductor $L_{21}$.

In the inverter mode of providing the high frequency alternating current during the second period of time $T_{HF}(t_2-t_3, t_4-t_5)$, the two switching transistors, for example, $Q_1$ and $Q_4$ in one diagonally disposed pair are controlled to simultaneously turn on and off while the switching transistors $Q_2$ and $Q_1$ in the other pair are controlled to simultaneously turn on and off in an alternating manner therewith. Thus, the alternating current appears in the series oscillating circuit including the primary winding $L_{21}$ and the blocking capacitor $C_2$ with no substantial direct current being caused to flow through the discharge lamp 10 and the inductor $L_1$, whereby inducing at the secondary winding $L_{22}$ the high frequency alternating current which circulates the closed loop of the secondary winding $L_{22}$, discharge lamp 10, and bypass capacitor $C_1$. Also in the inverter mode, when all the switching transistors are simultaneously turned off, the primary winding $L_{21}$ acts to fed back its accumulated energy to the dc voltage $V_1$ through the diodes $D_3$ and $D_4$ or the diodes $D_1$ and $D_4$.

MODIFICATION OF THE THIRD EMBODIMENT <FIG. 13>

Figure 13:
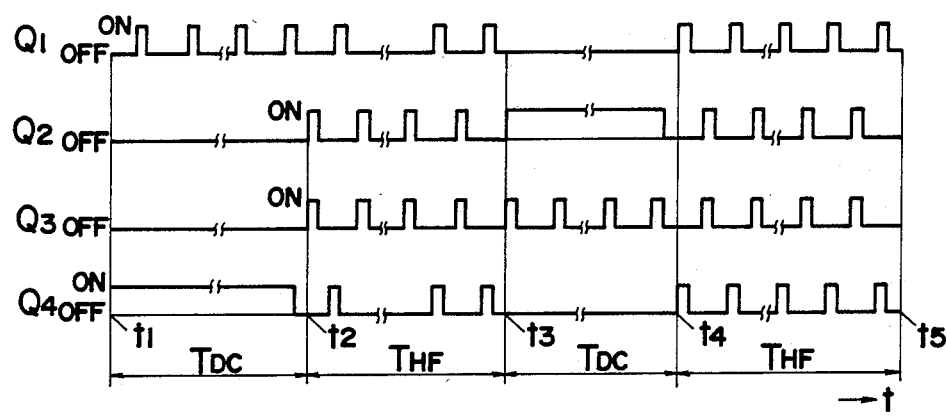
FIG. 13 is a timing diagram of waveforms illustrating another operation of the four switching transistors shown in FIG. 11 in accordance with a modification of the third embodiment.

A modification of the third embodiment utilizes the same circuit of FIG. 11 but in which the switching transistors $Q_1$ to $Q_4$ are controlled in a somewhat different manner from the third embodiment. As shown in FIG. 13, the difference is seen in that, during first period of time $T_{DC}$ (chopper mode), the first switching transistor $Q_1$ is controlled to turn on and off while the fourth switching transistor $Q_4$ is kept turned on $(t_1-t_2)$, and the third switching transistor $Q_3$ is controlled to turn on and off while the second switching transistor $Q_2$ is on $(t_3-t_4)$. Thus, upon the turning off of the first switching transistor $Q_1$, the switching transistor $Q_4$ is cooperative to the diode $D_2$ to form a closed loop including the inductor $L_1$ for circulating therethrough the current which is otherwise fed back to the dc voltage source $V_1$ through the diodes $D_3$ and $D_2$ as seen in the third embodiment. Likewise, upon turning off of the third switching transistor $Q_3$, the second switching transistor $Q_2$ is cooperative with the diode $D_4$ to circulate the current which is otherwise fed to the dc voltage source $V_1$ through the diodes $D_1$ and $D_4$ as seen in the third embodiment.

Figure 14:
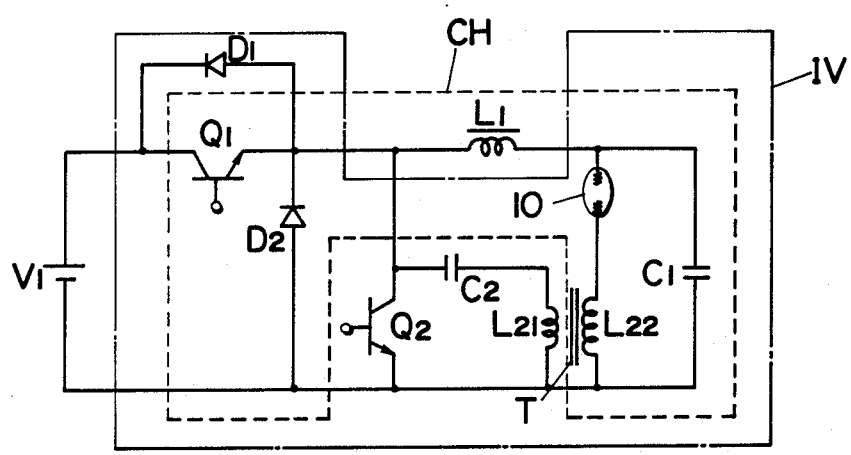
FIG. 14 is a circuit diagram of a fourth embodiment of the present invention.
Figure 15:
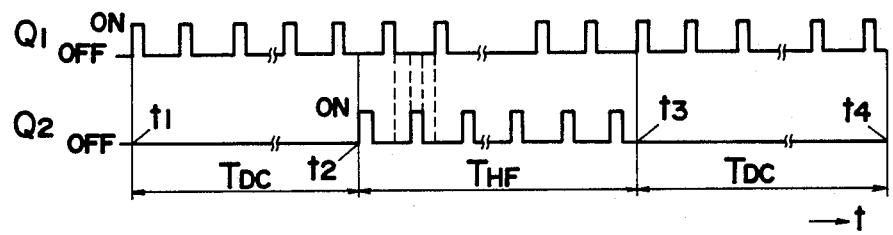
FIG. 15 is a timing diagram of waveforms illustrating the operation of the two switching transistors shown in FIG. 14.
Figure 16:
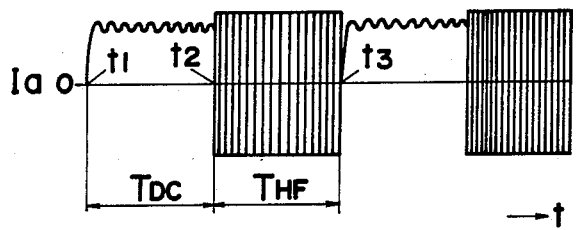
FIG. 16 is a waveform chart illustrating a composite lamp driving current in a conceptual form obtained by the switching operation of FIG. 15.

FOURTH EMBODIMENT <FIGS. 14 to 16>

A fourth embodiment of the present invention comprises first and second switching transistors $Q_1$ and $Q_2$ connected across the dc voltage source $V_1$ with first and second diodes $D_1$ and $D_2$ connected in antiparallel respectively with the first and second switching transistors $Q_1$ and $Q_2$. The inductor $L_1$ is connected in series with a parallel combination of the discharge lamp 10 and bypass capacitor $C_1$, which series-parallel combination is connected in parallel with the second switching transistor $Q_2$. Also included in the circuit is the transformer T of which primary winding $L_{21}$ is connected in series with the dc blocking capacitor $C_2$ across the second switching transistor $Q_2$. The secondary winding $L_{22}$ is inserted in series with the discharge lamp 10 in parallel with the bypass capacitor $C_1$. In this circuit, the chopper is defined by the first switching transistor $Q_1$, and the series-parallel combination of the inductor $L_1$, discharge lamp 10, bypass capacitor $C_1$, as enclosed in dotted lines CH in FIG. 14. Also, as enclosed in phantom lines IV in the figure, the inverter is defined by, in additions to the above components common the to the chopper, the second switching transistor $Q_2$ and the series circuit of the primary winding $L_{21}$ and the blocking capacitor $C_2$, and the secondary winding $L_{22}$.

In operation, the first and second switching transistors $Q_1$ and $Q_2$ are controlled in a manner as shown in FIG. 15 to provide a composite lamp driving current of FIG. 16. That is, in the chopper mode during the first period of time $T_{DC}(t_1-t_2$ and $t_3-t_4)$, the first switching transistor $Q_1$ is driven to turn on and off at a first high frequency to provide to the chopped dc voltage which is smoothed by the inductor $L_1$ and of which high frequency component is bypassed through the bypass capacitor $C_1$ to flow the resulting smoothed dc current to the discharge lamp 10. In the inverter mode during the second period of time $T_{HF}(t_2-t_3)$, the first and second switching transistors $Q_1$ and $Q_2$ are driven to alternately turn on and off with a dead-time therebetween at a second high frequency, which may be equal to or different from the first high frequency, to cause an oscillating current through the circuit of the primary winding $L_{21}$ and the blocking capacitor $C_2$ as repeating to charge and discharge the blocking capacitor $C_2$ in the same manner as effected in the previous embodiments. Thus, there is developed at the secondary windinq $L_{22}$ the induced current which will circulate through the closed loop of the secondary winding $L_{22}$, discharge lamp 10, and the bypass capacitor $C_1$ as the inductor $L_1$ acts to block such high frequency alternating current. In the inverter mode, the current flowing to the inductor $L_1$ is kept at a minimum by suitably selecting the values for the inductor $L_1$, bypass capacitor $C_1$, the secondary winding $L_{22}$, and the driving frequency or the second frequency at which the first and second switching transistors $Q_1$ and $Q_2$ are operated.

Figure 17:
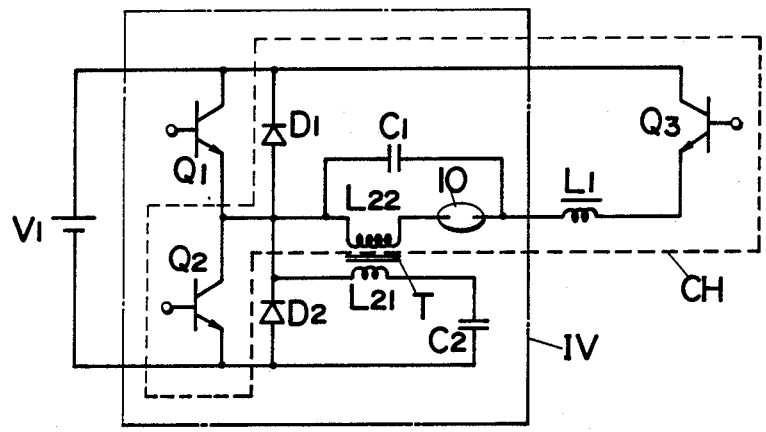
FIG. 17 is a circuit diagram of a fifth embodiment of the present invention.
Figure 18:
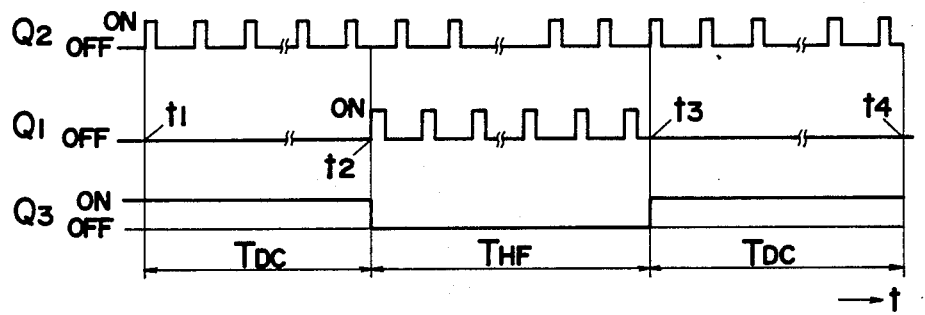
FIG. 18 is a timing diagram of waveforms illustrating the operation of the three switching transistors shown in FIG. 17.
Figure 19:
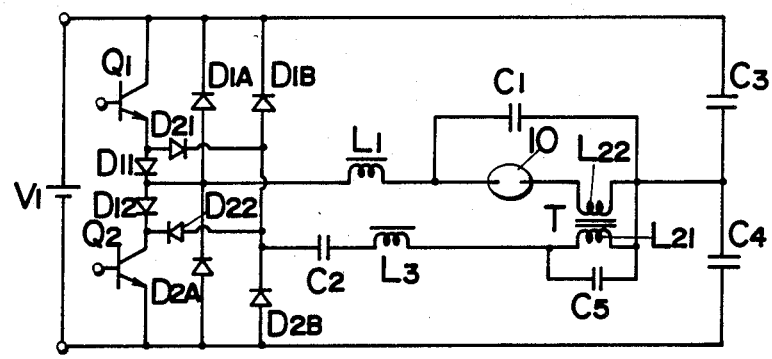
FIG. 19 is a circuit diagram of a sixth embodiment of the present invention.

FIFTH EMBODIMENT <FIGS. 17 to 19>

The discharge lamp driving circuit comprises the first and second switching transistors $Q_1$ and $Q_2$ connected across the dc voltage source $V_1$ with first and second diodes $D_1$ and $D_2$ connected in antiparallel relation respectively to the first and second switching transistors $Q_1$ and $Q_2$. A third switching transistor $Q_3$ is connected in series with the inductor $L_1$ and the parallel combination of the discharge lamp 10 and the bypass capacitor $C_1$ across the first switching transistor $Q_1$. The transformer T is connected in circuit with its primary winding $L_{21}$ connected in series with the blocking capacitor $C_2$ across the second switching transistor $Q_2$ and with its secondary winding $L_{22}$ inserted in series with the discharge lamp 10 and in parallel with the bypass capacitor $C_1$. In this embodiment, the chopper is defined by the second and third switching transistors $Q_2$ and $Q_3$, the series-parallel circuit of inductor $L_1$, discharge lamp 10 and bypass capacitor $C_1$, as enclosed in the dotted lines CH in FIG. 17, while the inverter is defined by, in addition to the second switching transistor $Q_2$, the parallel combination of discharge lamp 10 and bypass capacitor $C_1$ common to the chopper, the transformer T and the blocking capacitor $C_2$, as enclosed in phantom lines IV in the figure. These switching transistors $Q_1$, $Q_2$, and $Q_3$ are controlled in accordance with a timing chart of FIG. 18 so as to provide the like composite lamp driving current as seen shown in FIG. 16 of the fourth embodiment. That is, in the chopper mode during the period $T_{DC}$ ($t_1-t_2$ and $t_3-t_4$), the second switching transistor $Q_2$ is driven to turn on and off at a first high frequency while the first and third switching transistors $Q_1$ and $Q_3$ are turned off and on, respectively, whereby providing the smoothed dc current to the discharge lamp 10 in the same manner as in the fourth embodiment. In the inverter mode during the period $T_{HF}$ ($t_2-t_3$), the first and second switching transistors $Q_1$ and $Q_2$ are driven to alternately turned on and off with a dead-time therebetween at a second high frequency which may be equal to or different from the first high frequency, in order to produce an high frequency alternating current through the primary winding $L_{21}$ and consequently circulate the resulting high frequency alternating current through the closed loop of secondary winding $L_{22}$, discharge lamp 10, and bypass capacitor $C_1$, in the same manner as seen in the previous fourth embodiment. In the inverter mode, the third switching transistor $Q_3$ is kept turned off so that the discharge lamp 10 will not receive the current directly from the blocking capacitor $C_2$ or from the dc voltage source $V_1$.

Figure 20:
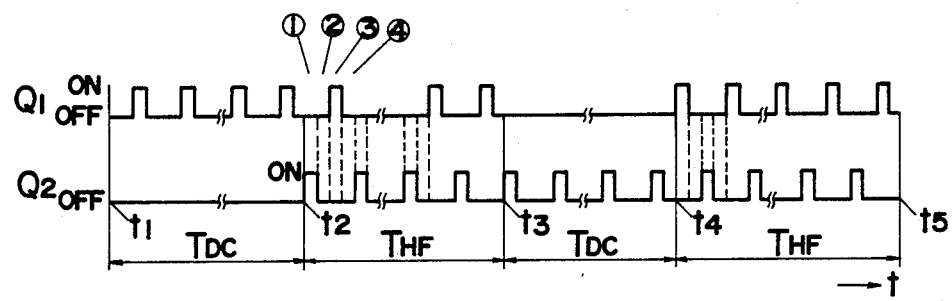
FIG. 20 is a timing diagram of waveforms illustrating the operation of the two switching transistors shown in FIG. 19.
Figure 21:
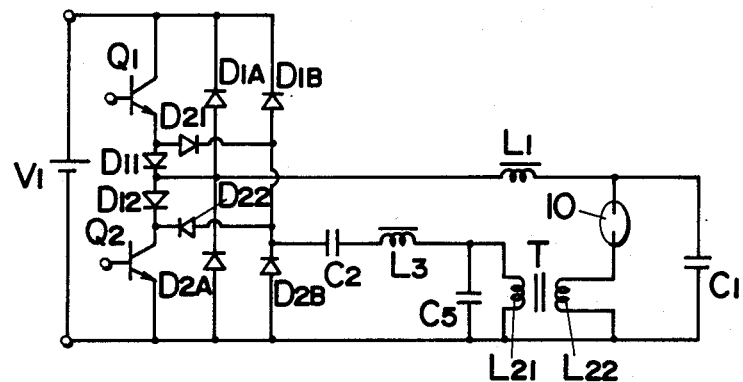
FIG. 21 is a circuit diagram of a seventh embodiment of the present invention.

SIXTH EMBODIMENT <FIGS. 19 and 20>

Referring to FIG. 19, a sixth embodiment of the present invention is shown to comprises the first and second switching transistors $Q_1$ and $Q_2$ which are coupled with a pair of capacitors $Q_3$ and $Q_4$ in a half-bridge configuration having its input ends connected across the dc voltage source $V_1$. First and second diodes $D_{1A}$ and $D_{2A}$ are connected in antiparallel relation to the first and second switching transistors $Q_1$ and $Q_2$, respectively. Included in the circuit is a diode network composed of a series combination of diodes $D_{11}$ and $D_{12}$ and another series combination of diodes $D_{21}$ and $D_{22}$. These series combinations are connected in parallel with one another between the first and second switching transistors $Q_1$ and $Q_2$. Another first diode $D_{1B}$ is connected in series with diode $D_{21}$ in antiparallel relation to the first switching transistor $Q_1$. Likewise, another second diode $D_{2B}$ is connected in series with diode $D_{22}$ in antiparallel relation to the second switching transistor $Q_2$. A series circuit of a first inductor $L_1$ and the parallel combination of discharge lamp 10 and bypass capacitor $C_1$ is connected between the output ends of the half-bridge or between the connection of diodes $D_{11}$ and $D_{12}$ and the connection of capacitors $C_3$ and $C_4$. Also included in the circuit is the transformer T with its secondary winding $L_{22}$ connected in series with the discharge lamp 10 in parallel with the bypass capacitor $C_1$ and with its primary winding $L_{21}$ connected in parallel with a capacitor $C_5$. The parallel combination of the primary winding $L_{21}$ and capacitor $C_5$ is connected in series with a second inductor $L_3$ and a blocking capacitor $C_2$ between the connection of capacitors $C_3$ and $C_4$ and the connection of diodes $D_{21}$ and $D_{22}$. In the above circuit, the capacitors $D_3$ and $C_4$ are charged from the dc voltage $V_1$ and in return supplies to the discharge lamp 10 the like composite lamp driving current of FIG. 5 as the first and second switching transistors $Q_1$ and $Q_2$ are driven in accordance with a timing diagram of FIG. 20.

In the chopper mode effected during the period $T_{DC}$ ($t_1-t_2$ and $t_3-t_4$ in FIG. 20), one of the first and second switching transistors $Q_1$ and $Q_2$ is driven to turn on and off at a first high frequency while the other switching transistor is kept turned off, in order to provide across the output ends of the half-bridge the chopped voltage from one of the corresponding capacitors $C_3$ and $C_4$. The chopped voltage is smoothed by the first inductor $L_1$ and has its high frequency component routed through the bypass capacitor $C_1$, whereby applying the resulting smoothed dc current to the discharge lamp 10. Such smoothed dc current has the polarity which is reversed from the period of $t_1-t_2$ to the period of $t_3$ to $t_4$. The above chopper operation can be explained in terms of the following repeated sequence. For example, in the period $T_{DC}$ of $t_1-t_2$, when the first transistor $Q_1$ is on while the second switching transistor $Q_2$ is off, the capacitor $C_3$ supplies a current which flows through first switching transistor $Q_1$, diode $D_{11}$, first inductor $L_1$, discharge lamp 10, secondary winding $L_{22}$, bypass capacitor $C_1$, and back to the capacitor $C_3$. Upon the subsequent turning off of the first switching transistor $Q_1$, the first inductor $L_1$ acts to continuously flow the current through the discharge lamp 10, secondary winding $L_{22}$, bypass capacitor $C_1$, capacitor $C_4$, diode $D_{24}$, and back to the first inductor $L_1$. During the period $T_{DC}$ of $t_3-t_4$, upon the turning on of the second switching transistor $Q_2$, the capacitor $C_1$, supplies a current which flows through secondary winding $L_{22}$, discharge lamp 10, bypass capacitor $C_1$, first inductor $L_1$, diode $D_{12}$, second switching transistor $Q_2$, and back to capacitor $C_1$. Upon the subsequent turning off of the second switching transistor $Q_2$, the first inductor $L_1$ causes the current to continuously flow therefrom and through diode $D_{14}$, capacitor $C_3$, secondary winding $L_{22}$, discharge lamp 10, and back to the first inductor $L_1$. With provision of the half-bridge configuration, the load circuit including the discharge lamp 10 receive one-half of the voltage of the dc voltage source.

For successfully bypassing the high frequency component of the chopped voltage through the bypass capacitor Chd 1 without causing an unstable lamp operation and at the same time without requiring the capacitor $C_1$ and the secondary winding $L_{22}$ to become bulky, the first high frequency, the inductor of the first inductor $L_1$, and the capacitance $C_1$ of the bypass capacitor $C_1$ may be selected such that the combined impedance of the lamp 10 and the secondary winding $L_{22}$ is to be 3 to 10 times that of the bypass capacitor $C_1$.

In the inverter mode during the period $T_{HF}$ ($t_2-t_3$ and $t_4-t_5$), the first and second switching transistors $Q_1$ and $Q_2$ are controlled to alternately turn on and off with a dead-time therebetween at a second high frequency to provide a high frequency alternating current to the discharge lamp 10 as repeating the following four occurrences (1) to (4). At the first occurrence (1), for example, as indicated in the period of $t_2-t_3$ in FIG. 20 in which the second switching transistor $Q_2$ is turned on while the first switching transistor $Q_1$ is off, the capacitor $C_4$ is cooperative with blocking capacitor $C_2$ to flow a current mainly through primary winding $L_{21}$, capacitor $C_5$, second inductor $L_3$, blocking capacitor $C_2$, diode $D_{22}$, second switching transistor $Q_2$, and back to capacitor $C_4$. At the second occurrence (2) in which both of the first and second switching transistors $Q_1$ and $Q_2$, are simultaneously off, the second inductor $L_1$ is cooperative with the primary winding $L_{21}$ to release the accumulated energy to continuously flow the current mainly through blocking capacitor $C_2$, diode $D_{1B}$, capacitor $C_3$, primary winding $L_{21}$, capacitor $C_5$, and back to the second inductor $L_3$. At the third occurrence (3) in which the first switching transistor $Q_1$ is on while the second switching transistor $Q_2$ is off, the capacitor $C_3$ is cooperative with the blocking capacitor $C_2$ to flow a current in the opposite direction mainly through first switching transistor $Q_1$, diode $D_{21}$, blocking capacitor $C_2$, second inductor $L_3$, primary winding $L_{21}$, capacitor $C_5$, and back to the capacitor $C_3$. At the fourth occurrence (4) in which both of the first and second switching transistors $Q_1$ and $Q_2$ are off, the second inductor $L_3$ is cooperative with the primary winding $L_{21}$ to continuously flow the current mainly through primary winding $L_{21}$, capacitor $C_5$, capacitor $C_4$, diode $D_{2B}$, blocking capacitor $C_2$, and back to the second inductor $L_3$.

In this connection, the diodes $D_{1B}$ and $D_{2B}$, which are connected in antiparallel relation respectively to the first and second switching transistors $Q_1$ and $Q_2$, provide first and second bypass routes for continuously flowing the instantaneous currents released from the second inductor $L_3$ and the primary winding $L_{21}$ at the second and fourth occurrences in which both of the switching transistors $Q_1$ and $Q_2$ are off.

Likewise, in the net second period of time $T_{HF}$ ($t_4-t_5$) which is initiated by turning on and off the first switching transistor $Q_1$ which has been active in the previous first time of period $T_{DC}$, the first and second switching transistors $Q_1$ and $Q_2$ are controlled to alternately turn on and off to produce the high alternating current through the primary winding $L_{21}$.

In this manner, during each second period of time $T_{HF}$, the high frequency alternating current continues to flow the primary winding $L_{21}$ to thereby induce at the secondary winding $L_{21}$ the corresponding high frequency alternating current which circulates through the closed loop of the secondary winding $L_{22}$, discharge lamp 10, and bypass capacitor $C_1$ as the inductor $L_1$ blocks such high frequency alternating current, whereby driving the discharge lamp 10 by thus obtained high frequency alternating current.

It should be noted at this point that during the above inverter mode the first and second switching transistors $Q_1$ and $Q_2$ are driven at the second high frequency which is higher than the first high frequency at which they are driven in the above chopper mode, such that the first inductor $L_1$ block the second high frequency to thereby allow only a minute current to divert into the circuit of first inductor $L_1$ and capacitor $C_1$. It should be also noted that, during the chopper mode, the above diode network of diodes $D_{11}$, $D_{12}$, $D_{21}$, and $D_{22}$ acts to prevent the current from diverting into the inverter circuit of blocking capacitor $C_2$, second inductor $L_3$, and primary winding $L_{21}$ since the diode network acts to maintain the voltage of the blocking capacitor $C_2$ once it is charged up to one-half of the voltage of the dc voltage source $V_1$.

To explain the diode network operation in detail with reference to the occurrences during the chopper operation $T_{DC}$, diodes $D_{12}$ and $D_{21}$ are cooperative to block the current from diverting into the inverter circuit when the first switching transistor $Q_1$ is on while the second transistor is off; diodes $D_{11}$, $D_{12}$, $D_{21}$, and $D_{22}$ are cooperative to block the same when both of the first and second switching transistors are off; and diodes $D_{12}$ and $D_{22}$ are cooperative to block the same when the second switching transistor $Q_2$ is on while the first switching transistor $Q_1$ is off.

With this arrangement of blocking the current from diverting into the inverter circuit during the chopper operation $T_{DC}$, no substantial alternating current is induced at the secondary windinq $L_{22}$ to thereby keep the smoothed dc current free from any ripple which would otherwise be superimposed thereupon in the absence of the diode network and would certainly result in unstable lamp operation.

In this embodiment, the discharge lamp 10 may be ignited with the addition of an L-C resonant starter circuit for inducing an increased ignition voltage across the secondary winding $L_{22}$ while providing the high frequency alternating current to the discharge lamp 10 by the operation of the inverter. It is also effective to utilize a pulse-width-modulation technique for controlling the output of the circuit while monitoring the condition of the lamp 10 by means of the lamp current or the lamp voltage.

The period $T_{HF}$ of the high frequency alternating current within one cycle ($T_{HF}30$ $T_{DC}$) of the composite lamp driving current may differ from differing discharge lamps utilized, but is found, for example, for a typical 80 W mercury-arc lamp having a rated lamp voltage of 115 V, to be preferably less than 20% of the on cycle in order to prevent the acoustic resonance and assure a stable lamp operation. In this instance, the one cycle ($T_{HF}+T_{DC}$) is preferably between several milliseconds and several tens of microseconds for the purpose of restraining flicker and noises.

The first and second switching frequencies can be suitably selected in relation to the inductances and capacitances of the circuit. For example, when first inductor $L_1$, the bypass capacitor $C_1$, second inductor $L_3$ blocking capacitor $C_2$, capacitor $C_5$ are selected to have respective values that $L_1=0.2$ mH, $C_5=0.1$ $\mu$F, $L_3=0.2$ mH, $C_2=0.15$ $\mu$F, and $C_5=0.033$ $\mu$F for driving the above mercury-arc lamp with the dc voltage source $V_1$ of 280 V, the first and second switching transistors $Q_1$ and $Q_2$ are operated respectively at 40 KHz during the period $T_{DC}$ and respectively at 80 KHz during the period $T_{HF}$ for providing the composite lamp driving current as indicated in FIG. 5.

SEVENTH EMBODIMENT <FIG. 21>

A seventh embodiment of the present invention has the similar circuit arrangement to that of the sixth embodiment except that the chopping operation is effected only by the first transistor $Q_1$. That is, in the chopper mode, only the first switching transistor $Q_1$ is driven to turn on and off, while in the inverter mode, both of the first and second switching transistors $Q_1$ and $Q_2$ are driven to operate in the same manner as in the sixth embodiment, thus providing the composite lamp driving current as seen in FIG. 16 The like diode network composed of diodes $D_{11}$, $D_{12}$, $D_{21}$, and $D_{22}$ is also included to prevent the diversion of the undesired current between the series circuit of first inductor $L_1$, discharge lamp 10, bypass capacitor $C_1$, and secondary winding $L_{22}$ and the inverter circuit of blocking capacitor $C_2$, second inductor $L_3$, and primary winding $L_{21}$.

Figure 22:
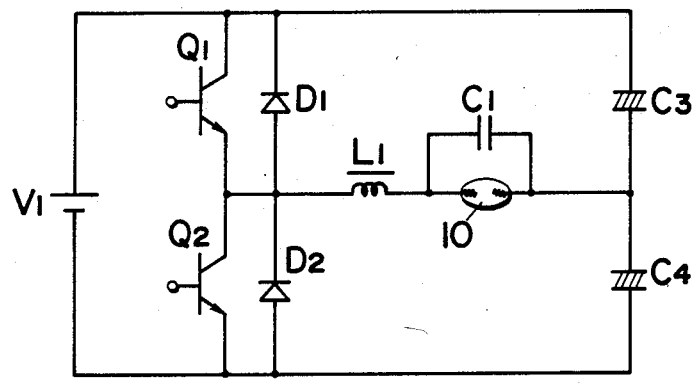
FIG. 22 is a circuit diagram of an eighth embodiment of the present invention.
Figure 23:
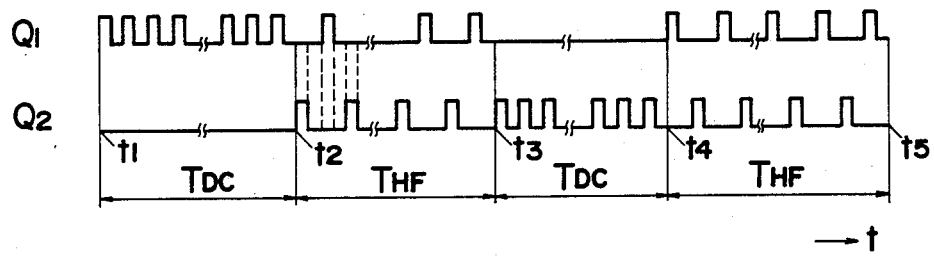
FIG. 23 is a timing diagram of waveforms illustrating the operation of the two switching transistors shown in FIG. 22.
Figure 24:
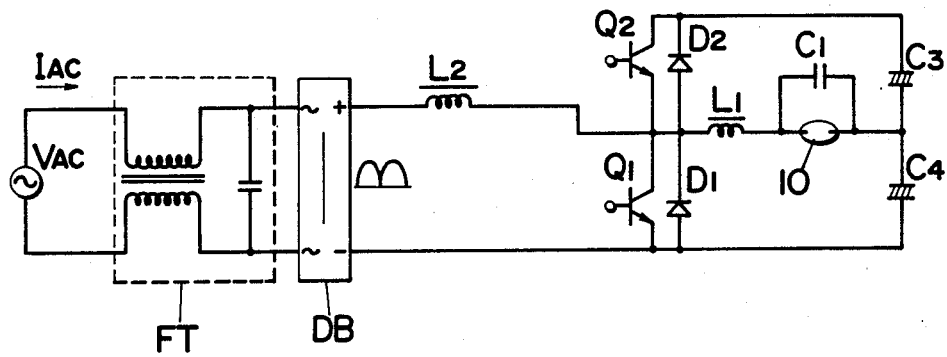
FIG. 24 is a circuit diagram of a ninth embodiment of the present invention.

EIGHT EMBODIMENT <FIGS. 22 and 23>

Referring now to FIG. 22, an eighth embodiment of the present invention is shown to comprise first and second switching transistors $Q_1$ and $Q_2$ connected in series across a dc voltage source $V_1$ with first and second diodes $D_1$ and $D_2$ connected in antiparallel relation to the first and second switching transistors $Q_1$ and $Q_2$, respectively. The first and second switching transistors $Q_1$ and $Q_2$ are coupled with capacitors $C_3$ and $C_4$ in a half-bridge configuration of which input ends are connected to the dc voltage source $V_1$. Connected between the output ends of the half-bridge is a series circuit of an inductor $L_1$ and a parallel combination of a discharge lamp 10 and a bypass capacitor $C_1$. The first and second switching transistors $Q_1$ and $Q_4$ are controlled in accordance with a timing chart of FIG. 23 to provide the like composite lamp driving current as shown in FIG. 5, as repeating the chopper and inverter functions.

In the chopper mode defined within the period $T_{DC}$ ($t_1-t_2$, $t_3-t_4$) of FIG. 23, one of the first and second switching transistors $Q_1$ and $Q_2$ is driven to turn on and off at a first high frequency while the other switching transistor is kept turned off in order to provide a chopped voltage supplied from the corresponding one of the capacitors $C_3$ and $C_4$. The chopped voltage is then smoothed by the inductor $L_1$ and of which high frequency component is bypass through the bypass capacitor $C_1$, thus providing the resulting smoothed dc current to the discharge lamp 10. As apparent from FIG. 23, the first and second switching transistors $Q_1$ and $Q_2$ are alternately made active from one cycle to the subsequent cycle to thereby reverse the polarity of the dc current applied to the discharge lamp 10 in a repeated manner. Such polarity reversal is not essential and therefore only one of the switching transistors $Q_1$ and $Q_2$ may be made active in the chopper mode of providing the dc current.

In the inverter mode defined within the period $T_{HF}$ ($t_2-t_3$, $t_4-t_5$), the first and second switching transistors $Q_1$ and $Q_2$ are driven to alternately turn on and off with a dead-time therebetween at a second high frequency which is lower than the first high frequency, such that the discharge lamp 10 receives a resulting high frequency alternating current as the circuit repeats the following four occurrences (1) to (4), as indicated in FIG. 23. At the first occurrence (1) in which the first switching transistor $Q_1$ is off and the second switching transistor $Q_2$ is on, the capacitor $C_4$ discharges and causes a current to flow therefrom mainly through the discharge lamp 10, inductor $L_1$, second switching transistor $Q_2$, and back to the capacitor $Q_4$. At the second occurrences (2) in which the first and second switching transistors $Q_1$ and $Q_2$ are simultaneously off, the inductor $L_1$ acts to continuously flow the current therefrom mainly through diode $D_1$, capacitor $C_3$, discharge lamp 10, and back to the inductor $L_1$. At the third occurrence (3) in which the first switching transistor $Q_1$ is on while second switching transistor $Q_2$ is off, the capacitor $C_3$ discharges and causes a current to flow therefrom in the opposite direction through first switching transistor $Q_1$, inductor $L_1$, discharge lamp 10, and back to the capacitor $C_3$. At the fourth occurrence (4) when first and second switching transistors $Q_1$ and $Q_2$ are simultaneously off, the inductor $L_1$ act to continuously flow the current therefrom through discharge lamp 10, capacitor $C_4$, diode $D_2$, and back to the inductor $L_1$.

In the above circuit, the inductance of $L_1$ is selected to have such a value that the second high frequency of the inverter operation will not be lowered to audio frequency. In this connection, the first high frequency of the chopper operation is selected to be higher than the second high frequency by such an extent as to increase the impedance of the inductor $L_1$ which limits the current flowing through the discharge lamp 10.

Typical values for the components of the above circuit are, for instance, that $C_1=0.7$ μF, $L_1=0.1$ mH when $V_1=140$ V and that $Q_1$ and $Q_2$ are driven to operate at 100 KHz in the chopper mode and at 30 KHz in the inverter mode.

NINTH EMBODIMENT <FIG. 24>

A ninth embodiment of the present invention utilizes a dc voltage source comprising a diode bridge DB connected to an ac voltage source $V_{AC}$ through a filtering circuit FT. The lamp driving circuit of the present embodiment is similar to that of the eighth embodiment except that the output of the dc voltage source DB is connected across the first switching transistor $Q_1$ through a second inductor $L_2$. Thus, in the chopper mode, only the first switching transistor $Q_1$ is driven to turn on and off in order to provide the smoothed dc current to the discharge lamp 10 in the manner as described with reference to the eighth embodiment. The inverter operation of the circuit is identical to that of the eighth embodiment. In this sense the first switching transistor $Q_1$ is commonly utilized both in the chopper and inverter modes. The characterizing feature of the present embodiment resides in that, in the chopper mode, the first switching transistor $Q_1$ is cooperative with the second inductor $L_2$ and diode $D_2$ to act as a positive booster for increasing the magnitude of the voltage acting to the series circuit of capacitors $C_3$ and $C_4$. That is, the energy accumulated in the second inductor $L_2$ during the chopping operation is additive to the dc power source DB to apply the resultant added voltage to the capacitors $C_3$ and $C_4$ for charging the same at the high frequency up to the voltage higher than that of the ac voltage source $V_{AC}$. Also with this result, the input current $I_{AC}$ can take the form of a sine wave, thereby making it possible to have an improved power factor of more than 90%.

TENTH EMBODIMENT <FIGS. 25 AND 26<

Figure 26:
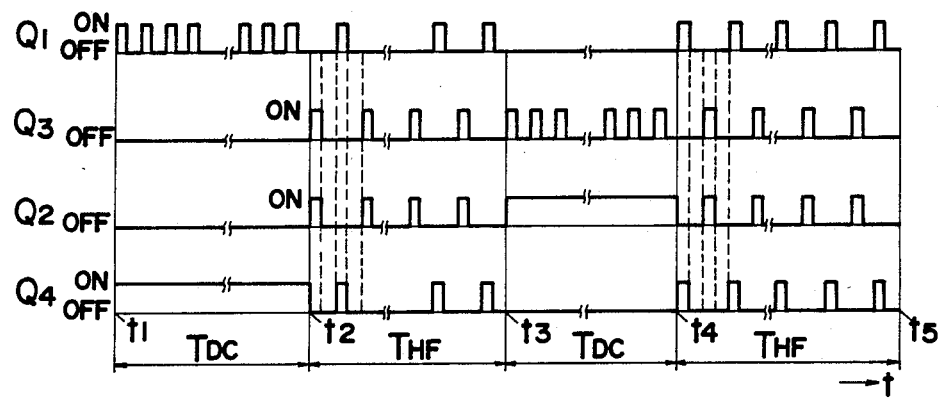
FIG. 26 is a timing diagram of waveforms illustrating the operation of the four switching transistors shown in FIG. 25.

A tenth embodiment of the present invention is similar to the eight embodiment except that another pair of switching transistors $Q_3$ and $Q_4$ is incorporated as replacing the pair of capacitors $C_3$ and $C_4$ to form a full-bridge configuration with diodes $D_3$ and $D_4$ connected in antiparallel relation to the switching transistors $Q_3$ and $Q_4$. These four switching transistors $Q_1$ to $Q_4$ are driven in accordance with a timing chart of FIG. 26 to provide the like composite lamp driving current as shown in FIG. 5.

In the chopper mode defined within the period of $T_{DC}(t_1-t_2)$ during which the second and third switching transistors $Q_2$ and $Q_3$ are off, the first switching transistor $Q_1$ is turned on and off at a first high frequency while the fourth switching transistor $Q_4$ is kept turned on in order to provide from the dc voltage $V_1$ a chopped voltage which is smoothed by the inductor $L_1$ and of which high frequency component is bypassed through the bypass capacitor $C_1$, thereby providing to the discharge lamp 10 the smoothed dc voltage. Also in the chopper mode defined within the period of $T_{DC}$ $(t_3-t_4)$ during which the first and fourth switching transistor $Q_1$ and $Q_4$ is off, the third switching transistor $Q_3$ is driven to turn on and off at the first frequency while the second switching transistor $Q_2$ is kept turned on, thereby providing the smoothed dc voltage of the opposite polarity in the like manner as above.

In the inverter mode defined within the period $T_{HF}$ $(t_2-t_3)$, the first and fourth switching transistors $Q_1$ and $Q_4$ are driven to turn on and off at a second high frequency, which is lower than the first high frequency, in synchronism with one another and in an alternate manner with the second and third switching transistors $Q_2$ and $Q_3$ turning on and off in synchronism with one another, thus providing the resulting high frequency alternating current to the discharge lamp 10 the high frequency alternating current. In the inverter mode defined within the period $T_{HF}$ $(t_4-t_5)$, these four transistors $Q_1$ to $Q_4$ are operated in the opposite manner to provide the like high frequency alternating current to the discharge lamp 10. The second frequency, at which the switching transistors $Q_1$ to $Q_4$ are operated to provide the high frequency alternating current during the period $T_{HF}$ ($t_2-t_3$ and $t_4-t_5$), is selected such as to cause a resonance in the series circuit of bypass capacitor $C_1$ and inductor $L_1$, enabling to apply a high voltage sufficient to operate the discharge lamp stably. Typical values for the components of the above circuit are, for instance, that $C_1=0.7$ μF, $L_1=0.1$ mH when $V_1=140$ V and that $Q_1$ and $Q_2$ are driven to operate at 100 KHz in the chopper mode and at 30 KHz in the inverter mode.

MODIFICATION OF TENTH EMBODIMENT <FIG. 27>

Figure 25:
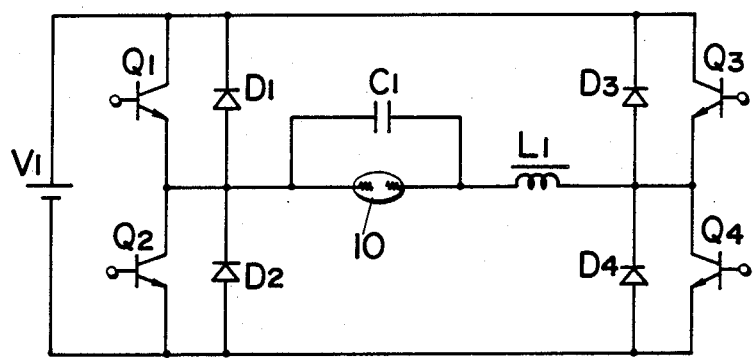
FIG. 25 is a circuit diagram of a tenth embodiment of the present invention.
Figure 27:
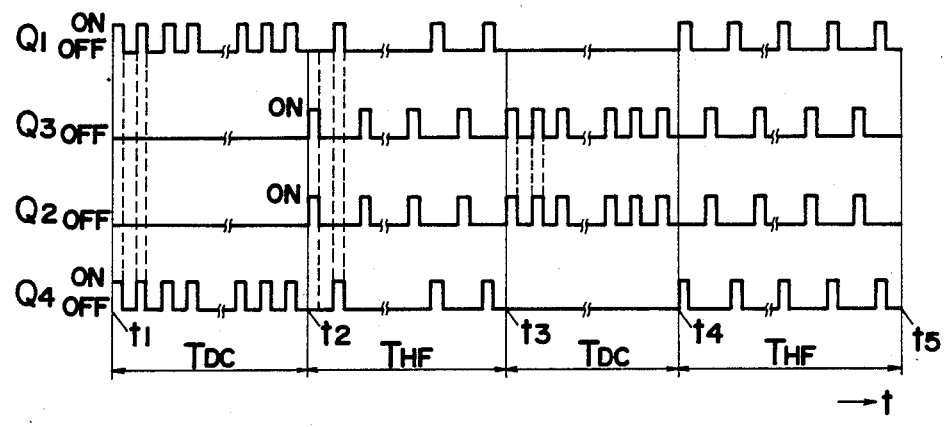
FIG. 27 is a timing diagram of waveforms illustrating another operation of the four switching transistors shown in FIG. 25 in accordance with a modification of the tenth embodiment.

The circuit of FIG. 25 of the tenth embodiment may be operated in accordance with a timing chart of FIG. 27 for providing the like composite lamp driving current to the discharge lamp. In this modification which is identical to the tenth embodiment except for the switching operation in the chopper mode. That is, during the period $T_{DC}$ $(t_1-t_2)$, the first and fourth switching transistors $Q_1$ and $Q_4$ are driven to simultaneously turn on and off, and during the period $T_{DC}$ $(t_3-t_4)$ the second and third switching transistors $Q_2$ and $Q_3$ are driven to simultaneously turn on and off. With this result, upon the simultaneous off of the paired transistors, the energy stored in the inductor $L_1$ in the previous turning on of the switching transistors is allowed to flow back to the dc voltage $V_1$ through the corresponding two of the diodes $D_1$ to $D_4$. For example, when the switching transistors $Q_1$ and $Q_4$ are simultaneously off after being turned on during the period $T_{DC}$ of $t_1-t_2$, the inductor $L_1$ causes an instantaneous current to flow therefrom through diode $D_3$, dc voltage source $V_1$, diode $D_2$, discharge lamp 10, and back to the inductor $L_1$. And when the second and third switching transistors $Q_2$ and $Q_3$ are off after being turned on, the inductor $L_1$ acts to continuously flow an instantaneous current in opposite direction therefrom through discharge lamp 10 and bypass capacitor $C_1$, diode $D_1$, dc voltage source $V_1$, diode $D_4$ and back to the inductor $L_1$.

What is claimed is:

1. A discharge lamp driving circuit comprising:
 a dc (direct current) voltage source;
 chopper means comprising a first switching circuit which is coupled to said dc voltage source to provide therefrom a periodically interrupted current and smooth the same for producing a smoothed dc current;

inverter means comprising a second switching circuit which is coupled to said dc voltage source for producing therefrom a high frequency alternating current;

control means connected to said chopper means and said inverter means to apply to said discharge lamp repeating cycle of a composite lamp driving current composed of said high frequency alternating current interrupted by said smoothed dc current;

said chopper means and said inverter means having in their first and second switching circuits at least one common switching element.

2. A discharge lamp driving circuit as set forth in claim 1,
wherein said chopper means is configured to apply said smoothed dc current while reversing the polarity thereof from one cycle to the subsequent cycle of said composite lamp driving current.

3. A discharge lamp driving circuit as set forth in claim 1,
wherein the first switching circuit of said chopper means comprises said at least one common switching element which is coupled in series circuit with an inductor, said voltage source, and a parallel combination of said discharge lamp and a bypass capacitor,
said switching element being driven to turn on and off at a first high frequency during a first period of time to produce said interrupted current which is smoothed by said first inductor and is removed of its high frequency component by said bypass capacitor in order to apply said smoothed dc current to said discharge lamp within each cycle of said composite lamp driving current;
the second switching circuit of said inverter means comprising a pair of first and second switching elements at least one of which is common to said first switching circuit, said first and second switching elements being connected in circuit with a dc blocking capacitor and a transformer with a primary winding and a secondary winding which is inserted in series relation with said discharge lamp and in parallel relation with said bypass capacitor;
said first and second switching elements being connected in series circuit across said dc voltage source with the series circuit of said dc blocking capacitor and the primary winding being connected across one of said first and second switching elements to form therewith a series oscillating circuit;
said first and second switching elements being controlled to alternately turn on and off at a second high frequency during a second period of time alternating with said first period of time in order to provide a high frequency alternating current at said series oscillating circuit as repeating to charge and discharge said dc blocking capacitor, whereby inducing said high frequency alternating current in the circuit of said secondary winding and said discharge lamp to provide said high frequency alternating current to said discharge lamp within each cycle of said composite lamp driving current.

4. A discharge lamp driving circuit as set forth in claim 1,
wherein said first switching circuit of said chopper means comprises a single pair of first and second switching elements and a pair of first and second capacitors arranged in a half bridge configuration having its input ends connected across said dc voltage source and having its output ends connected across a series circuit of an inductor and a parallel combination of said discharge lamp and a bypass capacitor;
one of said first and second switching elements being controlled to repetitively turn on and off at a first high frequency while the other switching element is kept turned off during a first period of time in order to provide to said discharge lamp within each cycle of said composite lamp driving current the dc current which is smoothed by said inductor and is removed of its high frequency component by said bypass capacitor, said first and second switching elements being controlled to alternately turn off at said first high frequency with one of them being driven to repetitively turned on and off so as to change the polarity of said smoothed dc current applied to said discharge lamp from one cycle to the subsequent cycle of said composite lamp driving current;
said second switching circuit of said inverter means comprising a pair of first and second switching elements at least one of which is common to said first switching circuit, said first and second switching elements being connected in circuit with a dc blocking capacitor and a transformer with a primary winding and a secondary winding which is inserted in series relation with said discharge lamp and in parallel relation with said bypass capacitor;
said first and second switching elements being connected in series circuit across said dc voltage source with the series circuit of said dc blocking capacitor and the primary winding being connected across one of said first and second switching elements to form therewith a series oscillating circuit;
said first and second switching elements being controlled to alternately turn on and off at a second high frequency during a second period of time alternating with said first period of time in order to provide a high frequency alternating current at said series oscillating circuit as repeating to charge and discharge said dc blocking capacitor, whereby inducing said high frequency alternating current in the circuit of said secondary winding and said discharge lamp to provide said high frequency alternating current to said discharge lamp within each cycle of said composite lamp driving current.

5. A discharge lamp driving circuit as set forth in claim 4,
wherein said oscillating circuit includes first and second diodes;
said first diode connected across said first switching element in antiparallel relation therewith form a first bypass route for a first instantaneous current which is discharged from said primary winding immediately after the simultaneous turning off of said first and second switching elements occurring after the first and second switching elements being simultaneously turned off and on, respectively, whereby allowing said first instantaneous current to continuously flow through said oscillating circuit in one direction through said first bypass route;
said second diode being connected across said second switching element in antiparallel relation therewith to form a second bypass route for a second instantaneous current which is discharged from said primary winding immediately after the simultaneous turning off of said first and second switching elements occurring after the first and second switching elements being simultaneously turned on and off respectively, whereby allowing said second instantaneous current to continuously flow through said oscillating circuit in the opposite direction through said second bypass route.

6. A discharge lamp driving circuit as set forth in claim 5, further including a diode network connected in circuit between said first switching circuit of said chopper means and said second switching circuit of said inverter means in such a manner as to prevent said dc blocking capacitor from repeating to be charged and discharged during the first period of time.

7. A discharge lamp driving circuit as set forth in claim 1, wherein said first and second switching circuits commonly includes a pair of first and second switching elements arranged in a bridge configuration having its input ends connected across said dc voltage source and having its output ends connected across a series circuit of an inductor and a parallel combination of said discharge lamp and a bypass capacitor;

one of said first and second switching elements being controlled to turn on and off at first frequency with the other switching element being kept turned off during a first period of time to provide to said series circuit a dc current which is smoothed by said inductor and is removed of its high frequency component by said bypass capacitor for feeding said smoothed dc current to said discharge lamp within each cycle of said composite lamp driving current;

said first and second switching elements being controlled to alternately turned on and off during a second period of time alternating with said first period of time in such a manner as to provide to said discharge lamp said high frequency alternating current with a second high frequency within each cycle of said composite lamp driving current.

8. A discharge lamp driving circuit as set forth in claim 7, wherein said second high frequency is lower than said first high frequency at which said switching elements are turned on and off for producing said smoothed dc current so that said high frequency alternating current at said second frequency is allowed to be substantially fed to said discharge lamp.

9. A discharge lamp driving circuit as set forth in claim 1, wherein said first switching circuit of said chopper means comprises a pair of first and second switching elements and a pair of first and second capacitors which are arranged in a half-bridge configuration having its input ends connected across said dc voltage source and having its output ends connected across a series circuit of an inductor and a parallel combination of said discharge lamp and a bypass capacitor;

each one of said first and second switching elements being controlled to turn on and off at a first high frequency with the other switching element being kept turned off during first period of time to provide to said series circuit a dc current which is smoothed by said inductor and is removed of its high frequency component by said bypass capacitor in order to provide said smoothed dc current to said discharge lamp while reversing the polarity thereof from one cycle to the subsequent cycle of said composite lamp driving current;

said first and second switching elements being controlled to turn on and off during a second period of time alternating with said first period of time to provide said high frequency alternating current with a second high frequency to said series circuit of said inductor and the parallel combination of said discharge lamp and said bypass capacitor; said second high frequency being lower than said first high frequency to such an extent that said second high frequency alternating current is supplied to said discharge lamp within each cycle of said composite lamp driving current while allowing said second high frequency component to be fed substantially to said discharge lamp without being substantially bypassed through said bypass capacitor.

* * * * *